United States Patent
Forrest et al.

(12)

(10) Patent No.: US 6,309,320 B1
(45) Date of Patent: Oct. 30, 2001

(54) DIRECT HOUSING MOUNT OF ELECTROMAGNET

(75) Inventors: James L. Forrest, Ashley; Robert Leeper, Fort Wayne, both of IN (US)

(73) Assignee: Auburn Gear, Inc., Auburn, IN (US)

(*) Notice: Subject to any disclaimer, the term of this patent is extended or adjusted under 35 U.S.C. 154(b) by 0 days.

(21) Appl. No.: 09/484,967

(22) Filed: Jan. 18, 2000

(51) Int. Cl.[7] ................................................. F16H 48/22
(52) U.S. Cl. ................................................................ 475/150
(58) Field of Search ................................................ 475/150

(56) References Cited

U.S. PATENT DOCUMENTS

| | | | |
|---|---|---|---|
| Re. 33,742 | 11/1991 | Blessing et al. | 475/150 |
| 4,662,499 | 5/1987 | Jordan | 192/82 T |
| 4,733,577 | 3/1988 | Griesser et al. | 74/710.5 |
| 4,776,234 | 10/1988 | Shea | 74/710.5 |
| 4,781,078 | 11/1988 | Blessing et al. | 74/711 |
| 4,955,853 * | 9/1990 | Bausch | 475/150 |
| 4,989,686 | 2/1991 | Miller et al. | 180/197 |
| 5,030,181 | 7/1991 | Keller | 475/150 |
| 5,041,069 | 8/1991 | Horst | 475/231 |
| 5,759,126 | 6/1998 | Zentmyer et al. | 475/150 |
| 5,911,643 * | 6/1999 | Godlew et al. | 475/150 |
| 5,989,147 * | 11/1999 | Forrest et al. | 475/150 |

* cited by examiner

Primary Examiner—Dirk Wright
(74) Attorney, Agent, or Firm—Baker & Daniels

(57) ABSTRACT

An electrically actuated limited slip axle assembly for transferring torque including a housing, a clutch, a casing and an electromagnet fixedly mounted to the housing. The casing is rotatably supported on bearings within the housing. The clutch is activated in response to energization of the electromagnet to transfer torque. In a first embodiment the electromagnet is coupled to a cup portion of the bearing, whereby the electromagnet is fixedly mounted to the housing via the bearing. In a second embodiment of the axle assembly includes a bearing spacer providing the fixed mount between the housing and the electromagnet.

19 Claims, 6 Drawing Sheets

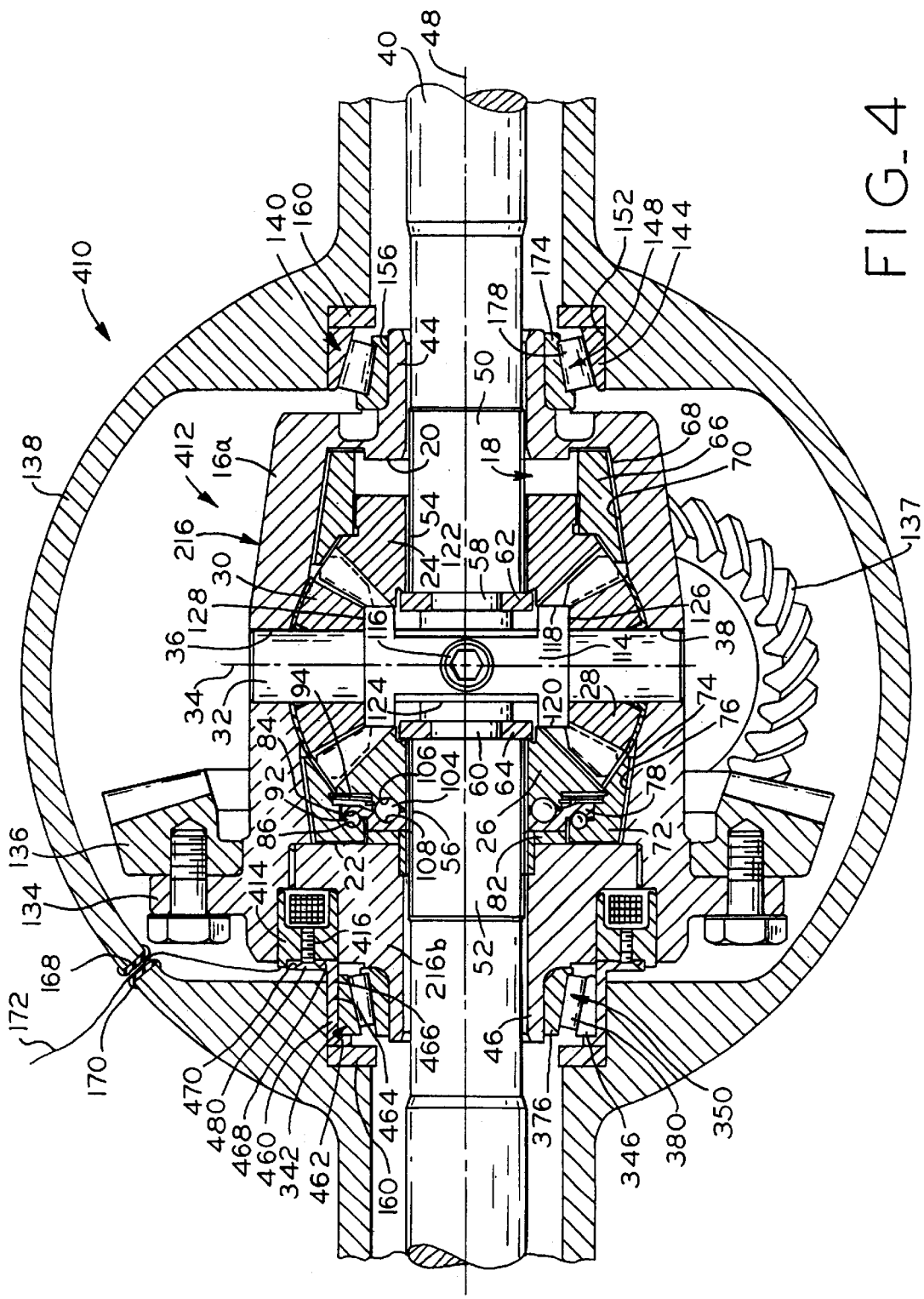
FIG_4

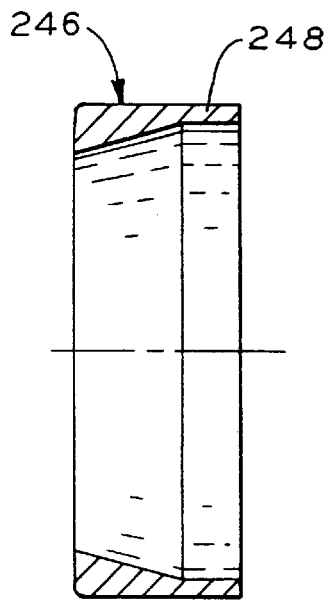
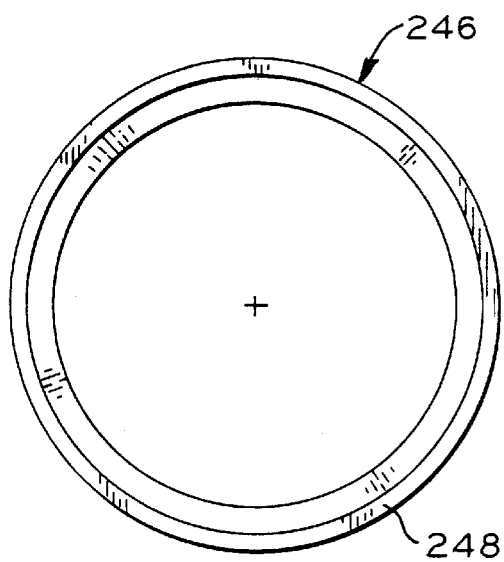
FIG_5A    FIG_5B
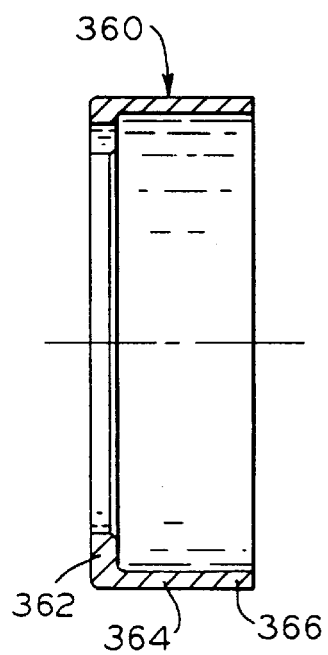
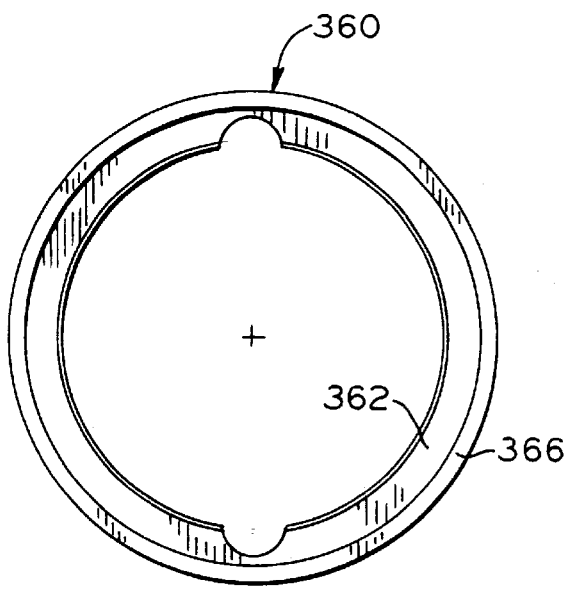
FIG_6A    FIG_6B

DIRECT HOUSING MOUNT OF ELECTROMAGNET

BACKGROUND OF THE INVENTION

1. Field of the Invention

The present invention relates to limited slip differentials, and more particularly, to the retention of the electromagnet in a limited slip differential having a electromagnetically actuated clutch.

2. Description of the Related Art

Differentials are well known in the prior art and allow each of a pair of output shafts or axles operatively coupled to a rotating input shaft to rotate at different speeds, thereby allowing the wheel associated with each output shaft to maintain traction with the road while the vehicle is turning. Such a device essentially distributes the torque provided by the input shaft between the output shafts.

The completely open differential, i.e., a differential without clutches or springs which restrict relative rotation between the axles and the rotating differential casing, is not well suited to slippery conditions in which one driven wheel experiences a much lower coefficient of friction than the other driven wheel: for instance, when one wheel of a vehicle is located on a patch of ice and the other wheel is on dry pavement. Under such conditions, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior means for limiting slippage between the axles and the differential casing use a frictional clutch mechanism, either clutch plates or a frustoconical engagement structure, operatively located between the rotating case and the axles. Certain embodiments of such prior means provide a clutch element attached to each of the side gears, and which frictionally engages a mating clutch element attached to the rotating casing or, if the clutch is of the conical variety, a complementary interior surface of the casing itself. Such embodiments may also include a bias mechanism, usually a spring, to apply an initial preload between the clutch and the differential casing. By using a frictional clutch with an initial preload, a minimum amount of torque can always be applied to a wheel having traction, e.g., a wheel located on dry pavement. The initial torque generates gear separating forces between the first pinion gears and the side gears intermeshed therewith. The gear separating forces urge the two side gears outward, away from each other, causing the clutch to lightly engage and develop additional torque at the driven wheels. Examples of such limited slip differentials which comprise cone clutches are disclosed in U.S. Pat Nos. 4,612,825 (Engle), 5,226,861 (Engle), 5,556,344 (Fox), and U.S. patent application Ser. No. 09/030,602, filed Feb. 25, 1998, each of which are assigned to the assignee of the present invention and expressly incorporated herein by reference.

Certain prior art limited slip differentials provide, between the first of the two side gears and its associated clutch element, interacting camming portions having ramp surfaces. In response to an initiating force, this clutch element is moved towards and into contact with the surface against which it frictionally engages, which may be a mating clutch element attached to the casing, or an interior surface of the casing itself, as the case may be, thereby axially separating the clutch element and its adjacent first side gear, the ramp surfaces of their interacting camming portions slidably engaging, the rotational speed of the clutch element beginning to match that of the differential casing due to the frictional engagement. Relative rotational movement between the ramp surfaces induces further axial separation of the clutch element and the first side gear. Because the clutch element is already in abutting contact with the surface against which it frictionally engages, the first side gear is forced axially away from the clutch element by the camming portions.

Certain embodiments of limited slip differentials utilize an electromagnet to actuate the clutch. The differential casing, in which the clutch is disposed, rotates within the housing and is rotatably supported by a pair of bearings. The electromagnet, which actuates the clutch, is mounted in fixed relationship to the axle housing and is rotatably supported on the differential casing by a separate bearing. An example of a prior electrically actuated limited slip differential is disclosed in allowed U.S. patent application Ser. No. 09/030,602.

FIG. 1 depicts an embodiment of prior axle assembly 10 having electrically actuated limited slip differential assembly 12. Axle assembly 10 may be a conventional axle assembly or comprise part of a transaxle assembly. Therefore, it is to be understood that the term "axle assembly" encompasses both conventional (rear wheel drive) axle assemblies as well as transaxle assemblies. Differential assembly 12 comprises electromagnet 14, rotatable casing 16 constructed of joined first and second casing parts 16a and 16b, respectively, and providing inner cavity 18, which is defined by the interior surface of the circumferential wall portion of first casing part 16a and end wall portions 20, 22 of first and second casing parts 16a, 16b, respectively. Disposed within cavity 18 are side gears 24, 26 and pinion gears 28, 30. The teeth of the side gears and pinion gears are intermeshed, as shown. Pinion gears 28, 30 are rotatably disposed upon cylindrical steel cross pin 32, which extends along axis 34. The ends of cross pin 32 are received in holes 36, 38 diametrically located in the circumferential wall of casing part 16a.

Axles 40, 42 are received through hubs 44, 46, respectively formed in casing end wall portions 20, 22, along common axis of rotation 48, which intersects and is perpendicular to axis 34. Axles 40, 42 are respectively provided with splined portions 50, 52, which are received in splines 54, 56 of side gears 24, 26, thereby rotatably fixing the side gears to the axles. The axles are provided with circumferential grooves 58, 60 in which are disposed C-rings 62, 64, which prevent the axles from being removed axially from their associated side gears. The terminal ends of the axles may abut against the cylindrical surface of cross pin 32, thereby restricting the axles' movement toward each other along axis 48.

Clutch element 66 is attached to side gear 24 and rotates therewith. Clutch element 66 is of the cone clutch variety and has frustoconical surface 68 which is adjacent to, and clutchedly interfaces with, complementary surface 70 provided on the interior of casing part 16a. Clutch element 72 is also of the cone clutch variety and has frustoconical surface 74 which is adjacent to, and clutchedly interfaces with, complementary surface 76 also provided on the interior of casing part 16a.

Disposed between cone clutch element 72 and side gear 26 is annular cam plate 78, which abuts thrust washer 82 adjacent end wall portion 22. First ball and ramp arrangement 84, 86, 92 is comprised of a first plurality of paired spiral slots 84, 86 located in cam plate 78 and primary cone clutch element 72, respectively. Slots 84, 86 define a helically ramping path followed by ball 92, which may be steel, disposed in each slot pair and a first ramp angle. With electromagnet 14 de-energized, balls 92 are seated in the deepest portion of slots 84, 86 by Belleville spring 94. The actuation sequence is created by the momentary difference in rotational speed between cone clutch element 72 and cam plate 78 as frustoconical surfaces 74 and 76 seat against each other.

Second ball and ramp arrangement 104, 106, 108 is comprised of a second plurality of paired spiral slots 106, 108 located in side gear 26 and cam plate 78, respectively. With electromagnet 14 de-energized, balls 104 are urged into the deepest portion of slots 106, 108 by Belleville spring 94. Each pair of slots 106, 108 defines a helically ramping path followed by ball 104, which may be steel, disposed in the slot pair and a second ramp angle. The second ramp angle is substantially less than first ramp angle. That second ramp angle is "shallower" than the first ramp angle means that ball 104 is able to transfer greater axially directed loads than ball 92. Thus, ball 104 is substantially larger in diameter than ball 92, providing a greater contact area with slots 106, 108 than ball 92 has with slots 84, 86, maintaining stresses associated with the higher loads at acceptable levels. As will be further described below, ball and ramp arrangement 104, 106, 108 transfers axial forces between cam plate 78, which abuts thrust washer 82 at end wall portion 22, and side gear 26, which communicates with transfer block 114, side gear 24, secondary cone clutch element 66 and surface 76 of casing part 16a. A more detailed discussion of the ball and ramp arrangements is disclosed in allowed U.S. patent application Ser. No. 09/030,602.

In operation, a variable coil current on electromagnet 14 induces a variable amount of magnetic clamping force between casing part 16a and cone clutch element 72, which induces a variable amount of torque to be exerted by casing part 16a on element 72. As electromagnet 14 is activated, axial separation of primary cone clutch element 72 and cam plate 78 is induced as cone clutch element 72 is magnetically pulled to the left against the force of Belleville spring 94 into clutched engagement with casing part 16a through frustoconical surfaces 74 and 76. In response to the initial flow of magnetic flux, cone clutch element 72 is pulled to the left and surfaces 74 and 76 abut, entering frictional engagement. As cone clutch element 72 and cam plate 78 separate axially, ball 92 is caused to rotate along the ramping helical paths of slots 84, 86 due to the relative rotation between element 72 and cam plate 78. Cam plate 78 is urged against thrust washer 82 by the force of Belleville spring 94 and gear separation forces between pinion gears 28, 30 and side gear 26. As ball 92 rotates further along the helical ramp paths, frustoconical surfaces 74, 76 are forced into tighter frictional engagement and cam plate 78, still abutting thrust washer 82, reaches the end of its rotational travel relative to cone clutch member 72.

Once cam plate 78 reaches its end of travel relative to cone clutch member 72, side gear 26 begins to rotate relative to cam plate 78. Relative rotation of side gear 26 and cam plate 78 causes ball 104 to rotate along the ramping helical paths of slots 106, 108, which axially follows the centerline of ball 104, from surfaces 110, 112. Side gear 26 moves towards the right, forcing cone clutch element 66 into abutment with casing part 16a via transfer block 114 and side gear 24 in the manner described above. As surfaces 68, 70 engage, side gear 26 reaches its end of travel, rotationally and axially, relative to cam plate 78. As ball 104 becomes more tightly compressed between slots 106, 108, force is transferred along a lines between end wall portion 22, thrust washer 82, cam plate 78, ball 104, side gear 26, transfer block 114, side gear 24, cone clutch member 66 and casing part 16a. Because the ramp angle of slots 106, 108 is smaller than the ramp angle of slots 84, 86, a greater engagement force is exerted on cone clutch element 66 than on cone clutch element 72. It is estimated that 80 percent of the total torque transfer between casing 16 and axles 40, 42 is provided by the engagement of clutch surfaces 68, 70, and only 20 percent by the engagement of clutch surfaces 74, 76.

Transfer block element 114, which may be steel, is disposed about cross pin 32 and adapted to move laterally relative thereto along axis 48 to transfer movement of side gear 26 to side gear 24, thereby engaging clutch element 66. Transfer block element 114 is attached directly to cross pin 32 by means of spring pin 116. Spring pin 116, which comprises a rolled sheet of spring steel, extends through centrally-located cross bore (not shown) which extends perpendicularly to axis 34 through cross pin 32. Spring pin 116 is retained in cross bore by means of an interference fit. The shear loads associated with torque transmission are exerted on cross pin 32 near its opposite ends, particularly between the circumferential wall of casing part 16a and the adjacent pinion gears 28, 30. At the longitudinal center of cross pin 32, where cross bore is located, there is no substantial shear stress exerted on cross pin 32.

Transfer block element 114 includes opposite bearing sides 118, 120 for transferring movement of side gear 26 to side gear 24, as described above, and allows terminal ends 122, 124 of axles 40, 42, respectively, to abut the cylindrical side surface of cross pin 32. Surfaces 126, 128 of transfer block element 114 abut pinion gears 28, 30, respectively, as in differential assembly 12, thereby restricting movement of the transfer block element, and thus cross pin 32, relative to casing 16 along axis 34. Thus it will be understood that transfer block 114 serves as a cross pin retention element. Transfer block 114 moves laterally relative to cross pin 32, along axis 48, such that rightward movement of side gear 26, described above, is transferred to side gear 24. Surface 118 of transfer block 114 is brought into abutting contact with the surface of side gear 24. Thus, during actuation of electromagnet 14, side gear 26 is urged rightward, as viewed in FIG. 1, into abutting contact with transfer block element 114. Transfer block element 114 moves rightward, into abutting contact with side gear 24; and side gear 24 moves rightward, urging surface 68 of clutch element 66 into frictional engagement with surface 70 of case part 16a, thereby providing additional torque transfer capacity to the differential than would otherwise be provided with single cone clutch element 72.

Provided on the exterior surface of casing part 16a is flange 134, to which ring gear 136 is attached. The teeth of ring gear 136 are in meshed engagement with the teeth of pinion gear 137 which is rotatably driven by an engine (not shown), thus rotating differential case 16 within axle housing 138. As casing 16 rotates, the sides of holes 36, 38 bear against the portions of the cylindrical surface of cross pin 32 in the holes. The rotation of cross pin 32 about axis 48 causes pinion gears 28, 30 to revolve about axis 48. The revolution of the pinion gears about axis 48 causes at least one of side gears 24, 26 to rotate about axis 48, thus causing at least one of axles 40, 42 to rotate about axis 48. Engagement of the clutch arrests relative rotation between the side gears and the differential casing.

Differential casing 16 is rotatably supported within axle housing 138 by means of first and second bearings 140, 142. Bearings 140, 142 each include cup portion 144, 146 and cone and roller portion 148, 150 each having cone 174, 176 and plurality of rollers 178, 180. Cup portions 144, 146 are disposed within recesses 152, 154 of axle housing 138, respectfully. Cone and roller portions 148, 150 are attached to first axially extending shoulders 156, 158 of casing portion 16b. Spacers 160 are provided axially between axle housing 138 and bearings 140, 142. Electromagnet 14 is rotatably supported on second differential casing portion 16b by bearing 162. Bearing 162 is attached to second axially extending shoulder 164 of casing portion 16b and recess 166 of electromagnet 14.

Electromagnet 14 is rotatably fixed relative to axle housing 138 and disposed in close proximity to casing 16, which rotates relative thereto. The voltage applied to electromagnet 14 to energize same and actuate clutch 72 may be controlled by a control system (not shown) which is in communication with sensors (not shown) which indicate, for example, excessive relative rotation between axles 40, 42, and thus the need for traction control. Housing 138 includes hole 168 fitted with rubber grommet 170 through which extend leads 172. Through leads 172 the control system provides voltage to electromagnet 14. As electromagnet 14 is energized, a magnetic initiating force is applied to clutch element 72 by a toroidal electromagnetic flux path (not shown) which is established about the annular electromagnet; the flux path flows through ferrous casing portions 16a and 16b and through clutch element 72. Clutch element 72 is thus magnetically drawn into engagement with casing 16 during operation of electromagnet 14.

One way to reduce the cost and improve the reliability of an axle assembly is to reduce the number of components parts. Reducing the number of bearings may reduce the cost of material, the cost of assembly labor, and the number of moving parts, thereby improving durability and reliability.

Thus, it is desirable to reduce the number of bearings in an axle assembly.

SUMMARY OF THE INVENTION

The present invention provides an improved means for mounting an electromagnet in a limited slip axle assembly of the type described above. In the inventive axle assembly the electromagnet is mounted directly to the fixed axle housing, rather than mounting the electromagnet on a bearing attached to the rotating casing, thereby reducing the number of bearings required in the axle assembly.

The present invention provides an electrically actuated limited slip axle assembly including a pair of rotatable axles, a housing, a pair of bearings disposed within the housing, a differential assembly having a casing, a pinion gear, a pair of side gears and a clutch, and an electromagnet fixedly mounted to the housing. The casing is rotatably supported on the bearings within the housing. The pinion gear is rotatably supported in the casing. The side gears are rotatably supported in the casing and meshingly engaged with the pinion gear. Each of the side gears is adapted to rotate with one of the axles. The clutch is activated in response to the electromagnet being energized and adapted to transfer torque between the casing and a side gear. The electromagnet is disposed within the housing and in operative proximity to the differential casing.

The present invention also provides an electrically actuated limited slip axle assembly including a pair of rotatable axles, a housing, a differential assembly having a casing, a pinion gear, a pair of side gears and a clutch, a bearing, and an electromagnet. The casing is rotatably supported within the housing. The pinion gear is rotatably supported in the casing. The side gears are rotatably supported in the casing and meshingly engaged with the pinion gear. Each of the side gears is adapted to rotate with one of the axles. The clutch is activated in response to the electromagnet being energized and adapted to transfer torque between the casing and a side gear. The bearing includes a cup portion, a cone, and a plurality of rollers. The cup portion and the cone are rotatable relative to each other. The cup portion is coupled to the housing and the cone is coupled to the casing. The electromagnet is disposed within the housing and in operative proximity to the differential casing and is connected to the cup portion of the bearing, whereby the electromagnet is fixedly mounted to the housing.

The present invention also provides an electrically actuated limited slip axle assembly including a pair of rotatable axles, a housing, a pair of bearings disposed within the housing, a differential assembly having a casing, a pinion gear, a pair of side gears and a clutch, a bearing spacer, and an electromagnet. The casing is rotatably supported on the bearings within the housing. The pinion gear is rotatably supported in the casing. The side gears are rotatably supported in the casing and meshingly engaged with the pinion gear. Each of the side gears is adapted to rotate with one of the axles. The clutch is activated in response to the electromagnet being energized and adapted to transfer torque between the casing and a side gear. The bearing spacer includes a first and second portion. The first portion is disposed between the housing and one of the bearings. The electromagnet is disposed within the housing and in operative proximity to the casing and connected to the second portion of the bearing spacer, whereby the electromagnet is fixedly mounted to the housing.

The present invention also provides an electrically actuated limited slip axle assembly including a pair of rotatable axles, a housing, a pair of bearings disposed in the housing, a differential assembly having a casing, a pinion gear, a pair of side gears and a clutch, an electromagnet, and means for fixedly mounting the electromagnet to the housing. The casing is rotatably supported on the bearings within the housing. The pinion gear is rotatably supported in the casing. The side gears are rotatably supported in the casing and meshingly engaged with the pinion gear. Each of the side gears is adapted to rotate with one of the axles. The clutch is activated in response to the electromagnet being energized and adapted to transfer torque between the casing and a side gear. The electromagnet is disposed within the housing and in operative proximity to the casing.

An advantage of the electrically actuated limited slip axle assembly of the present invention over previous such axle assemblies is that a bearing is eliminated between the casing and the electromagnet, thereby reducing costs, simplifying assembly and improving durability.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 4 is a sectional side view of a third embodiment of an electrically actuated limited slip axle assembly according to the present invention having its clutch-activating electromagnet attached to a second embodiment of a bearing spacer disposed between the axle housing and the smaller bearing;

FIG. 5A is a sectional side view of the extended bearing cup of the bearing of FIG. 2;

FIG. 5B is an end view of the extended bearing cup of FIG. 5A;

FIG. 6A is a sectional side view of the bearing spacer of FIG. 3;

FIG. 6B is an end view of the bearing spacer of FIG. 6A;

Figure 1:
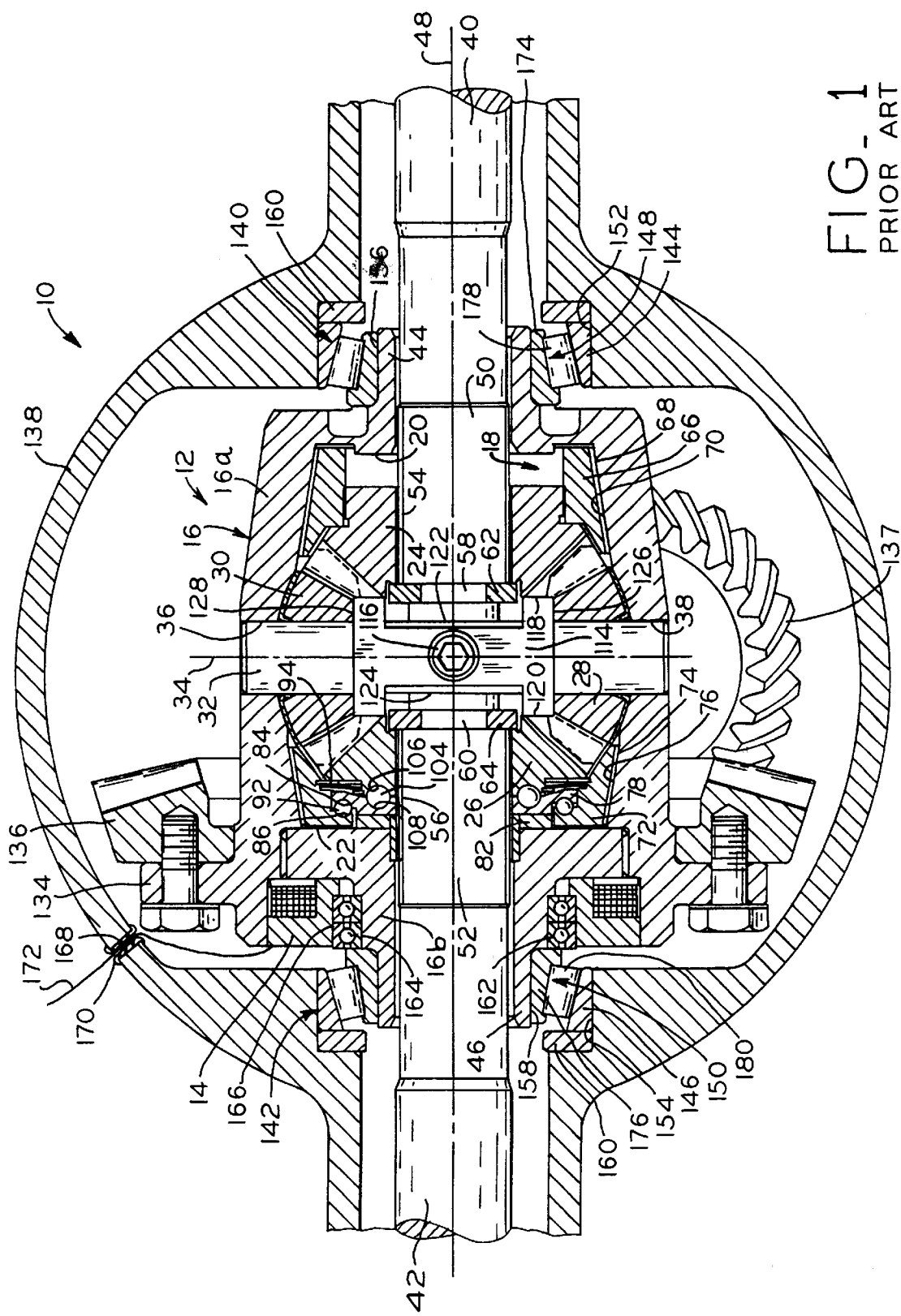
FIG. 1 is a sectional side view of a prior art electrically actuated limited slip axle assembly having its clutch-activating electromagnet rotatably supported on the differential casing by a separate bearing.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention in several forms, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Figure 2:
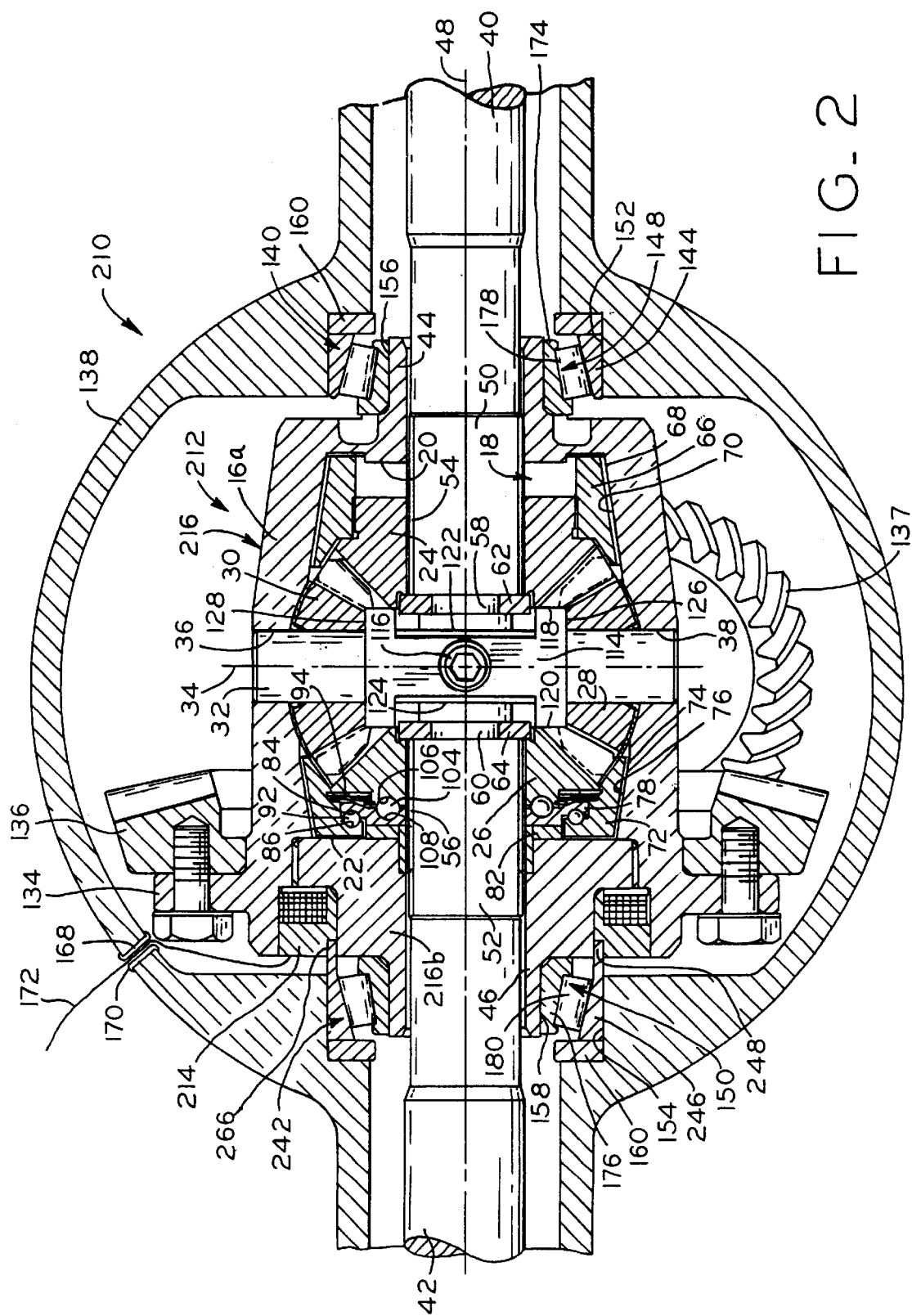
FIG. 2 is a sectional side view of a first embodiment of an electrically actuated limited slip axle assembly according to the present invention having its clutch-activating electromagnet attached to an extended bearing cup of a bearing which supports the differential casing within the axle housing.

Referring to FIG. 2, limited slip axle assembly 210, a first embodiment of the present invention, comprises axle housing 138, differential assembly 212 having casing 216 which is constructed of joined casing parts 16a and 216b, electromagnet 214, and bearing 242. Axle assembly 210 is substantially identical to axle assembly 10, described above, except as indicated hereinbelow. Elements in common with prior art axle assembly 10 are identified with the identical reference numbers.

Casing 216 is modified due to the elimination of bearing 162, which is a component of axle assembly 10 (FIG. 1). Shoulder 164 on casing portion 16b (FIG. 1) has been eliminated on casing portion 216b, eliminating a machining step. Bearing 242 includes cup portion 246 and cone and roller portion 150 having cone 176 and plurality of rollers 180. Cup portion 246 is disposed in recess 154 of housing 138 and has an axially extended portion 248 (See FIGS. 5A and 5B). Cone and roller portion 150 are disposed on shoulder 158 of casing portion 216b. Electromagnet 214 includes annular recess 266 for a press-fit engagement onto extending portion 248 of cup portion 246. Alternatively, electromagnet 214 can be spot welded to extending portion 248.

Figure 8:
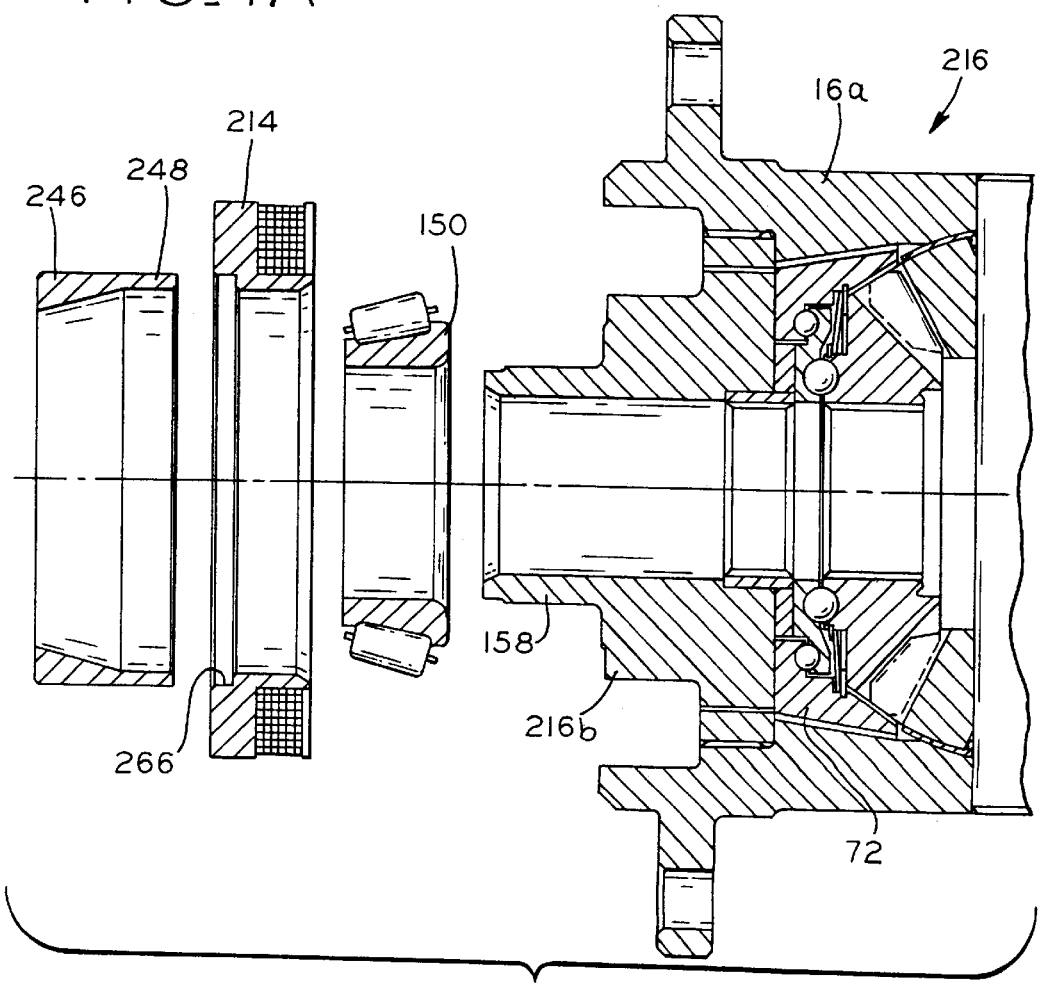
FIG. 8 is an exploded, sectional side view of a portion of the axle assembly of FIG. 2.

With reference to FIG. 8, during installation, annular recess 266 of electromagnet 214 is press-fitted onto extended portion 248 of cup portion 246, and cone and roller portion 150 is press-fitted onto shoulder 158 of casing 216. Cup portion 246 is coupled with cone and roller portion 150, forming bearing 242. Electromagnet 214 is thus placed in operative proximity to casing 216. Operative proximity means that electromagnet 214 is adjacent casing 216 and near cone clutch element 72, such that a variable coil current on electromagnet 214 induces a variable amount of magnetic clamping force between casing part 16a and cone clutch element 72. The assembly of bearing 242 and electromagnet 214 is then installed into housing 138. A pair of bearing caps (not shown) are installed over bearings 140, 242 to secure the assembly within axle housing 138. The bearing caps are semi-circular, a pair of bolts (not shown) secure each bearing cap to axle housing 138.

Bearings 140 and 242 are of equivalent size and differ only in that cup portion 246 of bearing 242 has extended portion 248 that cup portion 146 of bearing 140 does not have.

Figure 3:
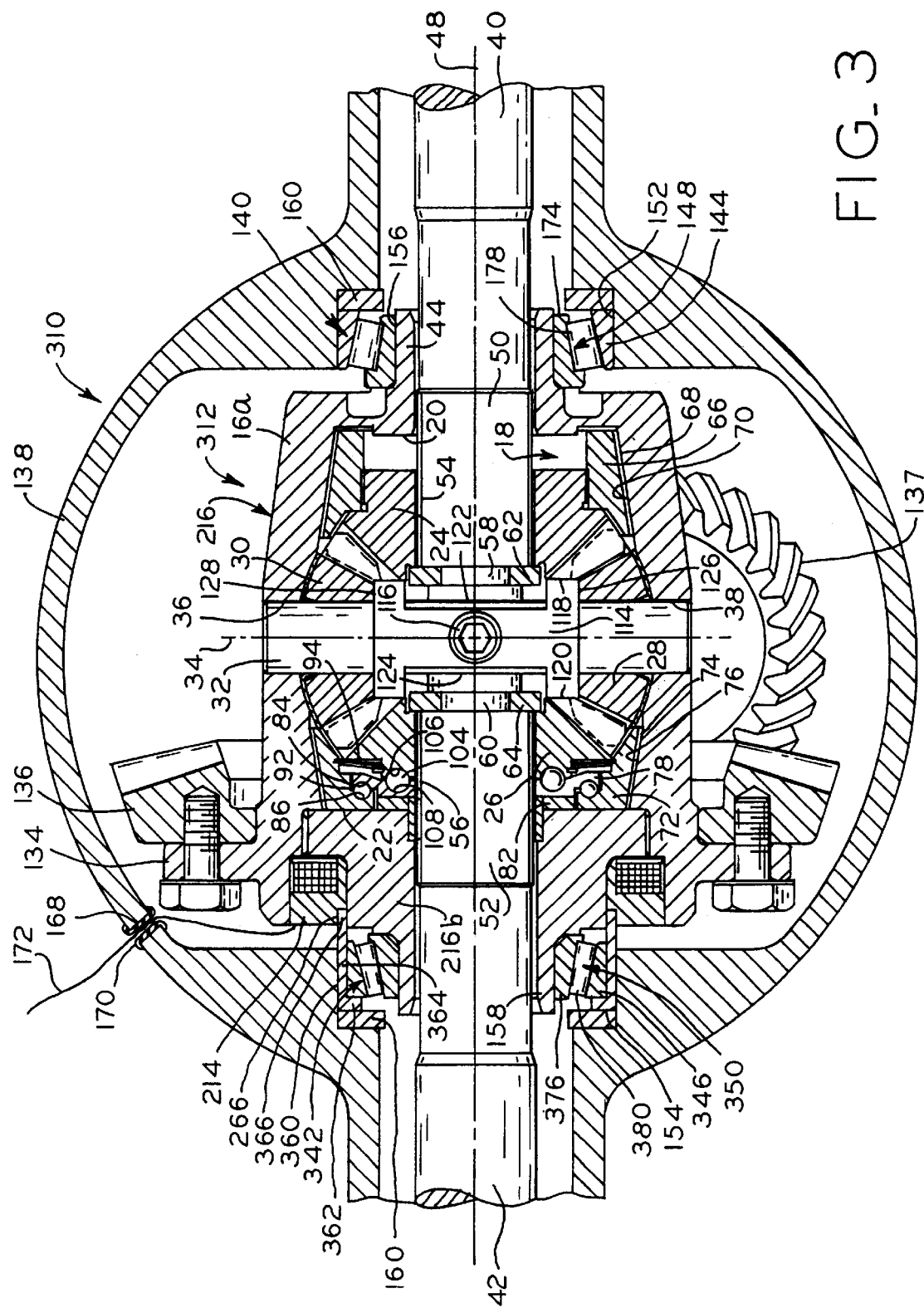
FIG. 3 is a sectional side view of a second embodiment of an electrically actuated limited slip axle assembly according to the present invention having its clutch-activating electromagnet attached to a first embodiment of a bearing spacer disposed between the axle housing and a smaller bearing.

Referring now to FIG. 3, there is shown limited slip axle assembly 310, a second embodiment of the present invention, which comprises axle housing 138, differential assembly 312 having casing 216 which is constructed of joined casing parts 16a and 216b, electromagnet 214, bearing 342 and bearing spacer 360. Axle assembly 310 is substantially identical to axle assembly 210, described above, except as indicated herein below.

Bearing 342 is smaller than bearing 242 and bearing spacer 360 has been added to support electromagnet 214. Smaller bearing 342, an off-the-shelf item, is less expensive than bearing 242, which is a unique part, owing to its extended cup portion 248. Bearing 342 includes cup portion 346 and cone and roller portion 350 having cone 376 and plurality of rollers 380. Bearing spacer 360 is disposed in recess 154 of housing 138. Cup portion 346 is disposed in spacer 360. Cone and roller portion 350 is attached to shoulder 158 of casing portion 216b. Bearing spacer 360 includes first and second portions 362, 364 (See FIGS. 6A and 6B). First portion 362 is disposed between spacer 160 in housing 138 and bearing 342. Second portion 364 has an axially extended portion 366. Annular recess 266 of electromagnet 214 is press-fitted or welded onto extended portion 366 of bearing spacer 360.

During installation annular recess 266 of electromagnet 214 and cup portion 346 of bearing 342 are press-fitted to spacer 360. Cone and roller portion 350 is press-fitted onto shoulder 158 of casing 216. Cup portion 346 is coupled with cone and roller portion 350 forming bearing 342 with electromagnet 214 in operative proximity to casing 216. This assembly is then installed into housing 138. A pair of bearing caps (not shown), as described above, are installed over bearings 140, 342 to secure the assembly within axle housing 138.

Referring now to FIG. 4, there is shown limited slip axle assembly 410, a third embodiment of the present invention, which is identical to axle assembly 310, described above, except that bearing spacer 460 and electromagnet 414 replace bearing spacer 360 and electromagnet 214, respectively.

Figure 7A:
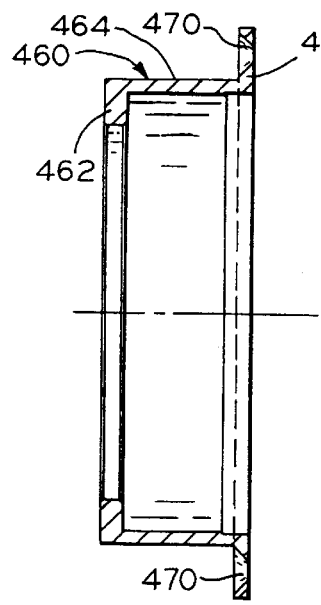
FIG. 7A is a sectional side view of the bearing spacer of FIG. 4.
Figure 7B:
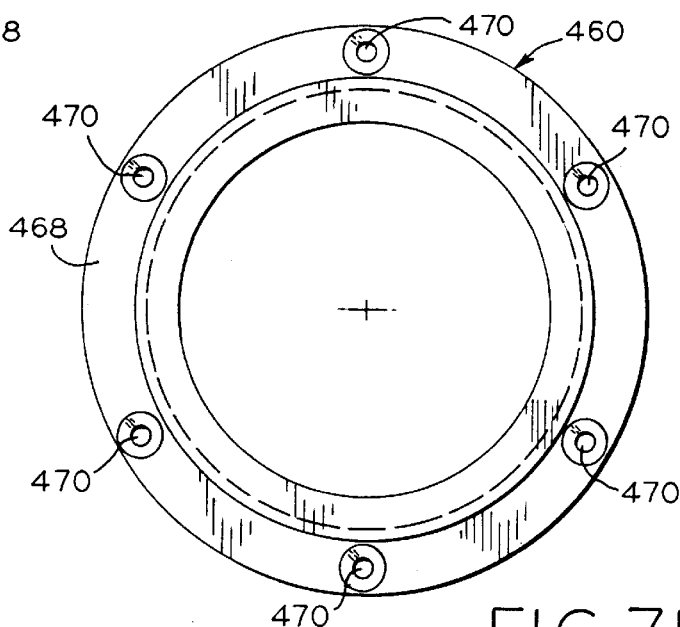
FIG. 7B is an end view of the bearing spacer of FIG. 7A.

Bearing spacer 460 includes first and second portions 462, 464 (See FIGS. 7A and 7B). First portion 462 is disposed between spacer 160 in housing 138 and bearing 342. Second portion 464 has an axially extended portion 466. Axially extended portion 466 is provided with radially extending annular flange 468 which axially abuts electromagnet 414. Fasteners 480 extend through holes 470 of flange 468 and are threadedly received in holes 416 of electromagnet 414, thereby attaching electromagnet 414 to bearing spacer 460.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An electrically actuated limited slip axle assembly comprising:
    a pair of rotatable axles;
    a housing;
    a pair of bearings disposed in said housing;
    a differential assembly having a casing, a pinion gear, a pair of side gears, and a clutch, said casing rotatably supported on said bearings within said housing, said pinion gear rotatably supported in said casing, said side gears rotatably supported in said casing and meshingly engaged with said pinion gear, each of said side gears adapted to rotate with one of said axles, said clutch adapted to transfer torque between said casing and a said side gear; and
    an electromagnet fixedly secured to said housing, said electromagnet in operative proximity to said casing, said clutch activated in response to energization of said electromagnet.

2. The axle assembly of claim 1, wherein said electromagnet is annular.

3. The axle assembly of claim 1, wherein said axle assembly is a transaxle assembly.

4. An electrically actuated limited slip axle assembly comprising:
    a pair of rotatable axles;
    a housing;
    a pair of bearings disposed in said housing;
    a differential assembly having a casing, a pinion gear, a pair of side gears, and a clutch, said casing rotatably supported on said bearings within said housing, said pinion gear rotatably supported in said casing, said side gears rotatably supported in said casing and meshingly engaged with said pinion gear, each of said side gears adapted to rotate with one of said axles, said clutch adapted to transfer torque between said casing and a said side gear; and
    an electromagnet fixedly secured to said housing, said electromagnet in operative proximity to said casing, said clutch activated in response to energization of said electromagnet, wherein one of said bearings includes a cup having an axially extended portion coupled to said electromagnet.

5. The axle assembly of claim 4, wherein said electromagnet is press-fitted onto said extended portion.

6. The axle assembly of claim 4, wherein said electromagnet is welded onto said extended portion.

7. An electrically actuated limited slip axle assembly comprising:
    a pair of rotatable axles;
    a housing;
    a pair of bearings disposed in said housing;
    a differential assembly having a casing, a pinion gear, a pair of side gears, and a clutch, said casing rotatably supported on said bearings within said housing, said pinion gear rotatably supported in said casing, said side gears rotatably supported in said casing and meshingly engaged with said pinion gear, each of said side gears adapted to rotate with one of said axles, said clutch adapted to transfer torque between said casing and a said side gear;
    an electromagnet fixedly secured to said housing, said electromagnet in operative proximity to said casing, said clutch activated in response to energization of said electromagnet; and
    a bearing spacer disposed between said housing and one of said bearings.

8. The axle assembly of claim 7, therein said electromagnet is press-fitted onto said bearing spacer.

9. The axle assembly of claim 7, wherein said electromagnet is welded onto said bearing spacer.

10. The axle assembly of claim 7, wherein said bearing spacer includes a radially extending flange axially abutting said electromagnet, said electromagnet attached to said flange.

11. The axle assembly of claim 10, further comprising a plurality of fasteners, said electromagnet attached to said flange through said fasteners.

12. An electrically actuated limited slip axle assembly comprising:
    a pair of rotatable axles;
    a housing;
    a pair of bearings disposed in said housing;
    a differential assembly having a casing, a pinion gear, a pair of side gears, and a clutch, said casing rotatably supported on said bearings within said housing, said pinion gear rotatably supported in said casing, said side gears rotatably supported in said casing and meshingly engaged with said pinion gear, each of said side gears adapted to rotate with one of said axles, said clutch adapted to transfer torque between said casing and a said side gear;
    an electromagnet, said electromagnet located in operative proximity to said casing; and
    a mounting element fixedly mounting said electromagnet securely to said housing, whereby said clutch is activated in response to energization of said electromagnet.

13. The axle assembly of claim 12, wherein said mounting element includes one of said bearings.

14. The axle assembly of claim 12, wherein said mounting element includes a bearing spacer.

15. An electrically actuated limited slip axle assembly comprising:
    a pair of rotatable axles;
    a housing;
    a differential assembly having a casing, a pinion gear, a pair of side gears, and a clutch, said casing rotatably supported within said housing, said pinion gear rotatably supported in said casing, said side gears rotatably supported in said casing and meshingly engaged with said pinion gear, each of said side gears adapted to rotate with one of said axles, said clutch adapted to transfer torque between said casing and a said side gear; and a bearing with a cup portion, a cone, and a plurality of rollers, said cup portion and said cone rotatable relative to each other, said cup portion connected to said housing, said cone connected to said casing; and an electromagnet connected to said cup portion of said bearing, said electromagnet in operative proximity to said casing, said clutch activated in response to said electromagnet being energized.

16. An electrically actuated limited slip axle assembly comprising:

a pair of rotatable axles;

a housing;

a pair of bearings disposed in said housing;

a differential assembly having a casing, a pinion gear, a pair of side gears, and a clutch, said casing rotatably supported on said bearings within said housing, said pinion gear rotatably supported in said casing, said side gears rotatably supported in said casing and meshingly engaged with said pinion gear, each of said side gears adapted to rotate with one of said axles, said clutch adapted to transfer torque between said casing and a said side gear; and a bearing spacer with a first and second portion, said first portion disposed between said housing and one of said bearings; and an electromagnet connected to said second portion of said bearing spacer, said electromagnet in operative proximity to said casing, said clutch activated in response to said electromagnet being energized.

17. The axle assembly of claim 16, wherein said electromagnet is press-fitted onto said bearing spacer.

18. The axle assembly of claim 16, wherein said second portion of said bearing spacer includes a radially extending flange axially abutting said electromagnet, said electromagnet attached to said flange.

19. The axle assembly of claim 18, further comprising a plurality of fasteners, said electromagnet attached to said flange through said fasteners.

* * * * *